United States Patent [19]

Husmann

[11] 4,368,809
[45] Jan. 18, 1983

[54] GRIP ROLLER OVERRUNNING CLUTCH

[75] Inventor: Horst Husmann, Osloss, Fed. Rep. of Germany

[73] Assignee: Volkswagenwerk Aktiengesellschaft, Wolfsburg, Fed. Rep. of Germany

[21] Appl. No.: 166,815

[22] Filed: Jul. 8, 1980

[30] Foreign Application Priority Data

Jul. 14, 1979 [DE] Fed. Rep. of Germany ........ 2928587

[51] Int. Cl.³ .................... F16D 15/00; F16D 41/07
[52] U.S. Cl. .................................................. 192/45
[58] Field of Search ...................... 192/45; 188/82.84

[56] References Cited

U.S. PATENT DOCUMENTS

| 3,031,052 | 4/1962 | Blinder | 192/45 |
| 3,031,053 | 4/1962 | Sauzedde et al. | 192/45 |
| 3,087,588 | 4/1963 | Fischer | 192/45 |
| 3,087,590 | 4/1963 | Gorsky | 192/45 |
| 3,118,525 | 1/1964 | Fischer | 192/45 |
| 3,904,005 | 9/1975 | Husmann | 192/45 |
| 4,054,192 | 10/1977 | Johnson | 192/45 |
| 4,088,211 | 5/1978 | Doller et al. | 192/45 |
| 4,106,602 | 8/1978 | Dieckermann | 192/45 |
| 4,185,724 | 1/1980 | Kitchin | 192/45 |
| 4,187,937 | 2/1980 | Kitchin | 192/45 |

FOREIGN PATENT DOCUMENTS

| 1213177 | 3/1966 | Fed. Rep. of Germany . |
| 1254916 | 11/1967 | Fed. Rep. of Germany . |
| 2758839 | 7/1979 | Fed. Rep. of Germany ........ 192/45 |

Primary Examiner—Rodney H. Bonck
Attorney, Agent, or Firm—Brumbaugh, Graves, Donohue & Raymond

[57] ABSTRACT

A grip roller overrunning clutch has grip rollers with associated pressure springs that load the rollers in the gripping direction, a first clutch part provided with grip ramps for the grip rollers, a second clutch part provided with a cylindrical running surface for the grip rollers and chamber-forming components for holding the grip rollers and associated pressure springs. The pressure springs are in the form of band springs folded in the longitudinal direction such that the folds in the assembled state extend in the radial direction. These springs are kept at a distance from the lateral boundary walls of the chamber-forming component by guiding devices.

2 Claims, 3 Drawing Figures

GRIP ROLLER OVERRUNNING CLUTCH

BACKGROUND OF THE INVENTION

The present invention concerns a grip roller overrunning clutch, e.g. for use in an automatic transmission.

Grip roller overrunning clutches typically have a first clutch part provided with grip ramps for the grip rollers, a second clutch part provided with a cylindrical running surface for the grip rollers, chamber-forming components holding the grip rollers and associated pressure springs loading the grip rollers in the gripping direction. The pressure springs are composed of band springs folded in the longitudinal direction and, in the assembled state, the folds extend in the radial direction.

In the known grip roller overrunning clutch constructions of this kind, the band springs are held between the rollers and chamber-forming components, e.g. a cage, without any substantial guide in the region of their contact with the grip rollers. During the overrunning operation, the springs, which attempt to push the grip rollers into the gripping position, are acted on discontinuously by the "shimmying," i.e., the relatively undefined motion in the peripheral direction of the overrun, of the grip rollers so that at least the first two folds or corrugations of the band spring are dynamically loaded to a varying extent through the action of the grip rollers. At the same time transverse forces occur which cause the folds of the band spring that extend radially relative to the overrun, to butt against one or the other boundary wall of the chamber-forming components. The constant discontinuous action on the folds leads to constant friction between the folds and the lateral boundary walls, and thus to wear which, in the end, may lead to a breaking of the spring.

SUMMARY OF THE INVENTION

It is the purpose of the present invention to avoid the wear caused by the butting of the spring folds against the lateral boundary walls of the chamber-forming components of prior grip roller overrunning clutches, and thereby to decrease the danger of breakage of the springs.

This purpose is attained in accordance with the invention in that means are provided for guiding the band springs at a distance from the boundary walls of the chamber-forming components. Due to this centering of the band springs, in particular in the zone of their application against the grip rollers, a butting of their folds against the boundary walls is prevented, and thereby the creation of friction and wear is largely avoided.

In accordance with a preferred example of an embodiment of the invention, the axial width of the band spring is rendered smaller than that of the grip rollers, and the end leg of the band spring which is applied against the grip roller in each case is made so that it extends to form a bent guide lug which is arranged between an end face of the grip roller and an adjacent lateral boundary wall of the chamber-forming components. In this manner, the axial path of the spring is limited via the butting of the guide lug against the end face of the grip roller or against the boundary wall of the chamber-forming components, so that if the axial width of the spring is properly dimensioned, a butting of the spring folds against the boundary walls is prevented.

BRIEF DESCRIPTION OF THE DRAWINGS

An example of an embodiment of the invention is explained in the following detailed description and in the drawings in which.

DESCRIPTION OF AN EXEMPLARLY EMBODIMENT

Figure 1:
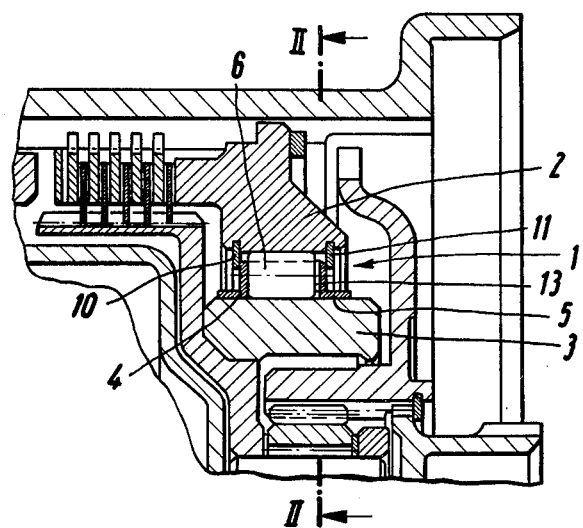
FIG. 1 shows a detail from a planetary gear of a hydrodynamic-mechanical automobile transmission comprising a grip roller overrunning clutch in accordance with the invention.

FIG. 1 shows a detail of a planetary gear of a so-called automatic automobile transmission wherein the grip roller overrunning clutch is designated by 1, its outer ring by 2, and its inner ring by 3. Two side plates 4, 5 form a cage having several chambers distributed over the periphery of the clutch between spacer angles 8. Within the cage and extending between the side plates are grip rollers 6 held by springs 7, e.g. band springs, to the spacer angles and uniformly distributed over the circumference of the clutch rings. The cage, which thus consists of the side plates 4 and 5 as well as the spacer angles 8, is secured axially by means of securing rings 10 and 11 in the outer ring 2 of the overrunning device. Also in the embodiment shown here, the cage is fixed to the outer ring 2, preventing relative rotation in the circumferential direction, whereas the inner ring 3, which has a cylindrical outer contour, rotates.

Figure 2:
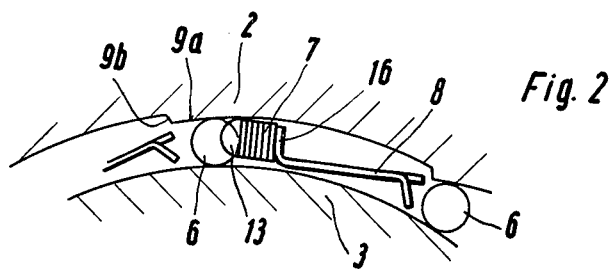
FIG. 2 shows a detail of a section through the grip roller overrunning clutch as per the lines II—II in FIG. 1.

As is apparent with greater clarity from FIG. 2, the outer ring 2 has grip ramps, each with a butting surface 9a and shoulders 9b. If the inner ring 3 is rotated clockwise, as shown in the drawing, the overrun operation will result, whereby the grip roller 6 is acted on by inner ring 3 in opposition to the force of the spring 7 in the direction moving the roller towards the foot zone of the butting surface 9a of the ramps where the grip rollers 6 can rotate freely. If the inner ring 3 turns in the opposite direction, i.e., counterclockwise, the grip rollers 6 are acted on by the spring 7 and move up the ramp until they are gripped between the butting surface 9a of the outer ring 2 and the inner ring 3, whereby the inner ring 3 is prevented from further counterclockwise rotation.

Figure 3:
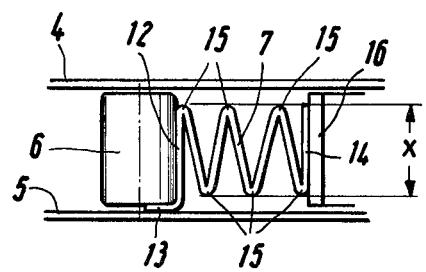
FIG. 3 shows a plan view of a portion of the overrunning clutch with the outer ring removed.

From FIG. 3 it becomes apparent that the springs 7 have an end leg 12 facing the grip roller 6, which leg is provided with a bent guide lug 13 arranged between an end face of the grip roller 6 and a side plate 5 of the cage. Inasmuch as the axial width X of the spring 7, i.e., the separation between the outer boundary surfaces of the folds 15 of the band spring, is rendered smaller than the axial length of the grip rollers 6, a proper lateral outward extension of the guide lug 13 will cause the spring 7 to be positioned approximately in the center of the cage between the two side surfaces 4 and 5. Consequently, a distance is maintained between the folds of the spring and the side walls, thus preventing butting of the folds against the side walls and wear of the spring during operation of the overrunning device.

In FIG. 3, an end leg opposite the end leg 12 of the band spring 7 is designated by 14. It bears against a web 16 of the spacer angle 8 and may be fixed thereto.

While the invention has been particularly shown and described with reference to a preferred embodiment thereof, it will be understood by those skilled in the art that various changes in form and details may be made therein without departing from the spirit and scope of the invention.

I claim:

1. In a grip roller overrunning clutch including grip rollers with associated pressure springs that have one of their ends facing and loading the grip rollers in the gripping direction, a first clutch part provided with grip ramps for the grip rollers, a second clutch part provided with a cylindrical running surface for the grip rollers, and chamber-forming components having lateral boundary walls holding the grip rollers and pressure springs in place, the pressure springs being composed of band springs folded so that in the assembled state the outer boundary surfaces of the folds extend in the peripheral direction of the cylindrical running surface and are at substantially the same distance therefrom, the improvement wherein centering means are provided at the ends of the band springs that face the grip roller for positively engaging the rollers to constantly maintain a distance between the band springs and the lateral boundary walls of the chamber-forming components during the overrunning operation.

2. In a grip roller overrunning clutch including grip rollers with associated pressure springs that have one of their ends facing and loading the grip rollers in the gripping direction, a first clutch part provided with grip ramps for the grip rollers, a second clutch part provided with a cylindrical running surface for the grip rollers, and chamber-forming components having lateral boundary walls holding the grip rollers and pressure springs in place, the pressure springs being composed of band springs folded so that in the assembled state the outer boundary surfaces of the folds extend in the peripheral direction of the cylindrical running surface and are at substantially the same distance therefrom, the improvement wherein centering means are provided at the ends of the band springs that face the grip rollers for guiding the band springs at a distance from the lateral boundary walls of the chamber-forming components, the axial width of each band spring being smaller than that of the associated grip roller, and wherein the end leg of each band spring which is applied to the associated grip roller extends beyond the width of the spring to form a bent guide lug arranged between an end face of the grip roller and an adjacent boundary wall.

* * * * *